US007555634B1

(12) United States Patent
Thatipelli et al.

(10) Patent No.: US 7,555,634 B1
(45) Date of Patent: Jun. 30, 2009

(54) MULTIPLE DATA HAZARDS DETECTION AND RESOLUTION UNIT

(75) Inventors: Krishna M. Thatipelli, Fremont, CA (US); Balakrishna Venkatrao, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 735 days.

(21) Appl. No.: 10/830,244

(22) Filed: Apr. 22, 2004

(51) Int. Cl.
*G06F 13/00* (2006.01)

(52) U.S. Cl. ..................................... 712/216

(58) Field of Classification Search ................ 712/216, 712/217, 218
See application file for complete search history.

(56) References Cited

U.S. PATENT DOCUMENTS

| | | | |
|---|---|---|---|
| 4,998,221 | A | 3/1991 | Correale, Jr. |
| 5,724,538 | A | 3/1998 | Morris et al. |
| 5,987,595 | A | 11/1999 | Yoaz et al. |
| 5,996,068 | A | 11/1999 | Dwyer et al. |
| 5,999,727 | A * | 12/1999 | Panwar et al. ............. 712/225 |
| 6,058,472 | A * | 5/2000 | Panwar et al. ............. 712/218 |
| 6,108,770 | A * | 8/2000 | Chrysos et al. ............ 712/216 |
| 6,263,404 | B1 | 7/2001 | Borkenhagen et al. |
| 6,349,382 | B1 | 2/2002 | Feiste et al. |
| 6,438,681 | B1 * | 8/2002 | Arnold et al. ............. 712/216 |
| 6,604,192 | B1 * | 8/2003 | Arnold et al. ............. 712/217 |
| 6,618,803 | B1 * | 9/2003 | Hannum et al. ........... 712/225 |
| 6,658,554 | B1 * | 12/2003 | Moshovos et al. ......... 712/216 |
| 6,877,088 | B2 | 4/2005 | Dice |
| 6,938,148 | B2 | 8/2005 | Moore et al. |
| 6,970,996 | B1 | 11/2005 | Green |
| 7,028,166 | B2 | 4/2006 | Pickett |
| 7,035,997 | B1 | 4/2006 | Mussoll et al. |
| 7,213,130 | B2 | 5/2007 | Teruyama |
| 2003/0084038 | A1 | 5/2003 | Balogh et al. |
| 2004/0044881 | A1 * | 3/2004 | Maier et al. ............... 712/218 |
| 2005/0193283 | A1 | 9/2005 | Reinhardt et al. |

OTHER PUBLICATIONS

The American Heritage® Dictionary of the English Language. 2000 Boston, MA: Houghton Mifflin.credoreference 0789818.*
Collins English Dictionary, Harper Collins Pub, 2000., credorference entry 2675460.*
Archibald et al., "Cache Coherence Protocols: Evaluation Using a Multiprocessor Simulation Model", ACM Transactions on Computer Systems, vol. 4, No. 4, pp. 273-298, Nov. 1986.

(Continued)

*Primary Examiner*—Eric Coleman
(74) *Attorney, Agent, or Firm*—Dorsey & Whitney LLP

(57) ABSTRACT

Order indication logic can be recycled for at least two different data hazards, thus reducing the amount of processor real estate consumed by data hazard resolution logic. The logic also allows a single priority picker to be utilized for coloring without the cost of additional pipeline stages. A single priority picker can be utilized to identify memory operations for performing RAW bypass and for resolving OERs. For instance, a data hazard resolution unit resolves at least two different data hazards between resident memory operations and incoming memory operations with a set of logic that indicates order of the resident memory operations relative to the incoming memory operations. The indicated order corresponds to the data hazard being resolved. The data hazard resolution unit includes a priority picker to select one of the indicated resident memory operations for either data hazard.

67 Claims, 10 Drawing Sheets

OTHER PUBLICATIONS

Bianchini, Ricardo et al., "Evaluating the Effect of Coherence Protocols on the Performance of Parallel Programming Constructs", International Journal of Parallel Programming, vol. 26, No. 2, pp. 143-181, 1998.

Chaiken et al., "Directory-Based Cache Coherence in Large-Scale Multiprocessors", Computer, vol. 23, No. 6, pp. 49-58, Jun. 1990.

Eggers et al., "A Characterization of Sharing in Parallel Programs and its Application to Coherency Protocol Evaluation", 15$^{th}$ Annual International Symposium on Computer Architecture, IEEE, pp. 373-382, May 30-Jun. 2, 1988.

Eggers et al., "The Effect of Sharing on the Cache and Bus Performance of Parallel Programs", International Conference on Architectural Support for Programming Languages and Operating Systems, pp. 1-16, Apr. 1989.

Gharachorloo et al., "Memory Consistency and Event Ordering in Scalable Shared-Memory Multiprocessors", 25 Years of the International Symposia on Computer Architecture, Barcelona, Spain, pp. 1-14, Jun. 27-Jul. 2, 1998.

Goodman, James R., "Using Cache Memory to Reduce Processor-Memory Traffic", 25 Years of the International Symposia on Computer Architecture, Barcelona, Spain, pp. 32-33, Jun. 27-Jul. 2, 1998.

Hennessy et al., "Computer Architecture: A Quantitative Approach", Third Edition, pp. 177-178 and 184-189, 2003.

James, David V., "Distributed-Directory Scheme: Scalable Coherent Interface", Computer, vol. 23, No. 6, pp. 74-77, Jun. 1990.

Lennox et al., "Transporting User Control Information in SIP Register Payloads", Internet Engineering task Force Internet Draft, pp. 1-12, Oct. 31, 2000.

Nikolopoulos, Dmitris, "Advanced Computer Architecture Lecture 10 Limits to ILP, Vector Processing", Lecture Slides, http://www.cs.wm.edu/~dsn/courses/654/lectures/lecture10.pdf, 10 pages, Feb. 22, 2005.

\* cited by examiner

INCLUDES RECYCLABLE LOGIC FOR AT LEAST TWO DIFFERENT TYPES OF DATA HAZARDS AND A SINGLE PRIORITY PICKER FOR DATA HAZARD RESOLUTION

MULTIPLE DATA HAZARDS DETECTION AND RESOLUTION UNIT

CROSS REFERENCE TO RELATED APPLICATION

This application is related to commonly owned, co-pending U.S. patent application Ser. No. 10/747,584, filed Dec. 29, 2003, naming as inventors Krishna M. Thatipelli and Balakrishna Venkatrao, entitled "Efficient Read After Write Bypass," which is incorporated herein by reference in its entirety.

BACKGROUND

1. Field of the Invention

The present invention relates to the field of computers. More specifically, the present invention relates to computer architecture.

2. Description of the Related Art

Out-of-order processors issue and execute instructions out-of-order to gain performance benefits. However, data dependencies exist between certain instructions and require preservation of those dependencies. Violation of those data dependencies results in a data hazard. Two particular data hazards are read-after-write (RAW) and 2) write-after-read (WAR), also referred to as overeager load (OEL).

A store instruction writes data into a designated memory location. A load instruction reads data from a designated memory location. If the store and load instructions are accessing the same memory location and the store instruction is older than the load instruction (i.e., the store instruction precedes the load instruction in the program sequence that includes these instructions), then the load instruction may depend on the store instruction, assuming there are no other intervening store instructions. An additional factor that affects dependency between instructions includes the size of the data being written or read. Since the store instruction requires more time than a load instruction, there is a possibility that the load instruction will access the memory location before the store instruction completes. If so, then the load instruction will access stale data. To resolve this RAW data hazard without losing the benefit of out-of-order processing, RAW bypass is performed. The data being written by the store instruction is passed to the load instruction before the store instruction actually writes it to the memory location.

An OEL hazard occurs when a processor issues and executes a load instruction that depends on an older store instruction before the store instruction is issued. Again, the load instruction will read stale data because the store instruction has not written to the memory location. To avoid this data hazard, the load instruction is rewound (i.e., flushed from the execution pipeline to start over) and a dependency is imposed on the load instruction so that it does not issue until after the store instruction. In addition, some processors utilize a "coloring" technique to identify instructions with data dependencies in order to impose those data dependencies.

A conventional processor resolves these two data hazards with separate logic. The RAW logic identifies issued store instructions that are older than an issued load instruction. The OEL logic identifies issued load instructions that are younger than an issued store instruction. The processor utilizes two separate priority pickers for performing operations to resolve the two data hazards. The separate logic and separate priority pickers occupy valuable area, which becomes even more valuable as processor designs evolve to incorporate more power and functionality.

SUMMARY OF THE INVENTION

It has been discovered that the same logic and a single priority picker can be utilized to identify memory operations for resolving both RAW data hazards and overeager read data hazards. Utilizing a single priority picker and the same logic to handle two different data hazards reduces area consumed by data hazard resolution logic, thus making the valuable processor area available for other purposes. In addition, logic that allows a single priority picker to be utilized provides the benefits of coloring without the cost of additional pipeline stages. The logic selects resident memory operations with a first order characteristic relative to an incoming memory operation for a first data hazard. Manipulating order information of the incoming memory operation allows the same logic to indicate memory operations with a second order characteristic relative to an incoming memory operation for a second data hazard.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 4A depicts an exemplary priority picker that selects a resident memory operation with a particular order characteristic according to realizations of the invention. FIG. 4B depicts another exemplary priority picker that selects a resident memory operation for data hazard resolution operations according to realizations of the invention.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. For instance, realizations of the invention can be implemented in one or more units to determine data hazards and/or resolve data hazards, such as a collection of queues and logic (e.g., a load store queue, a memory disambiguation buffer, etc.). However, it is understood that the described invention may be practiced without these specific details. In other instances, well-known protocols, structures and techniques have not been shown in detail in order not to obscure the invention.

Figure 1:
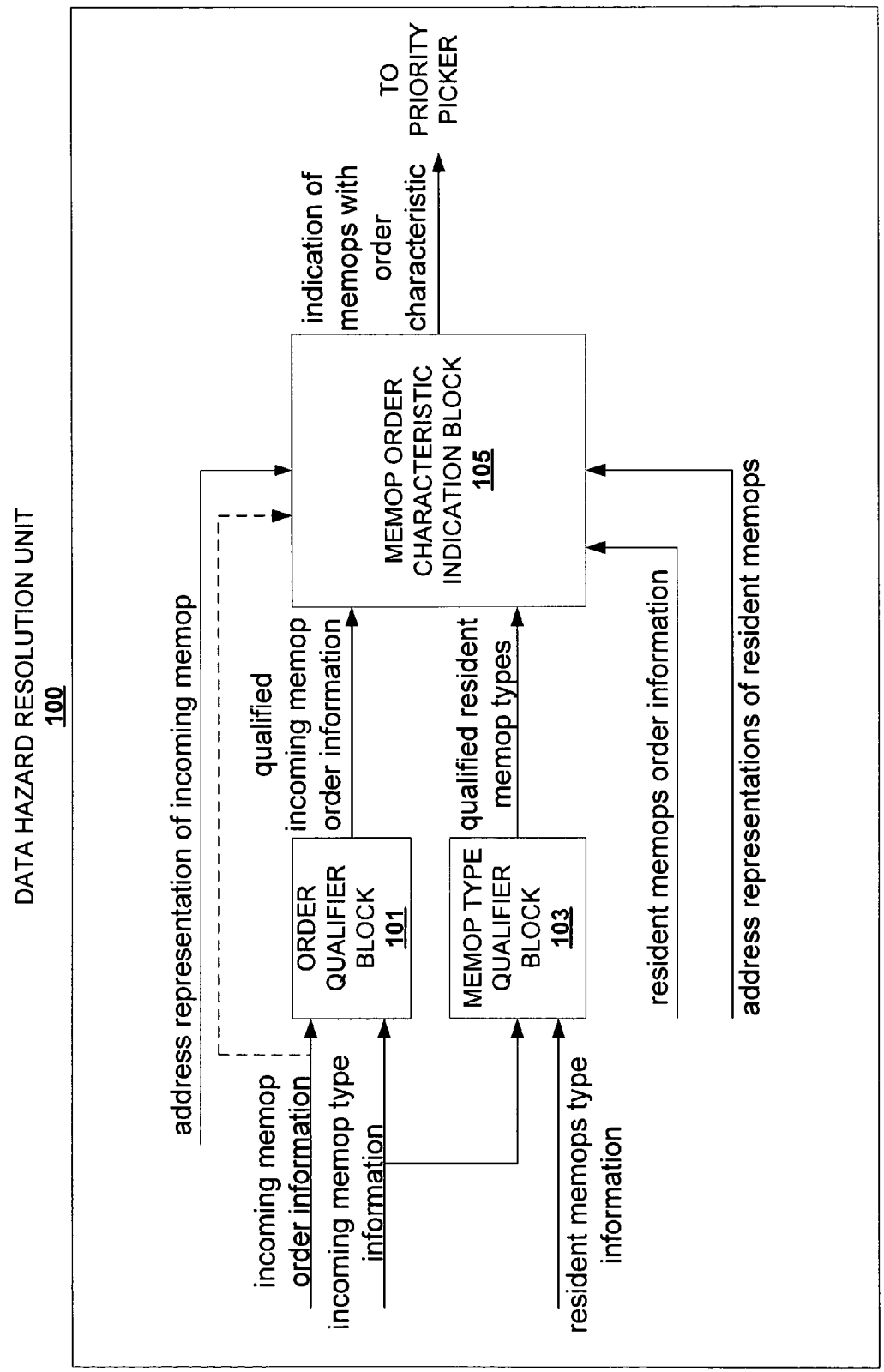
FIG. 1 depicts an exemplary data hazard resolution unit with logic for indicating memory operations with an order characteristic according to realizations of the invention.

FIG. 1 depicts an exemplary data hazard resolution unit with logic for indicating memory operations with an order characteristic according to realizations of the invention. The data hazard resolution unit 100 (e.g., a load store queue, a memory disambiguation buffer, etc.) includes an order qualifier block 101, a memory operation type qualifier block 103, and a memory operation order characteristic indication block 105. The order qualifier block 101 receives incoming memory operation order information (e.g., index information, age information, scheduling information, wrapping information, etc.) and incoming memory operation type information (e.g., indication of read type memory operation, write type memory operation, etc.). The order qualifier block 101 qualifies the incoming memory operation order information based on the received incoming memory operation type information. If the incoming memory operation type information indicates that an incoming memory operation is of a particular type, then the order qualifier block 101 modifies the incoming memory operation order information. Otherwise, the incoming memory operation order information remains unchanged as it flows to the memory operation order characteristic indication block 105.

Figure 2:
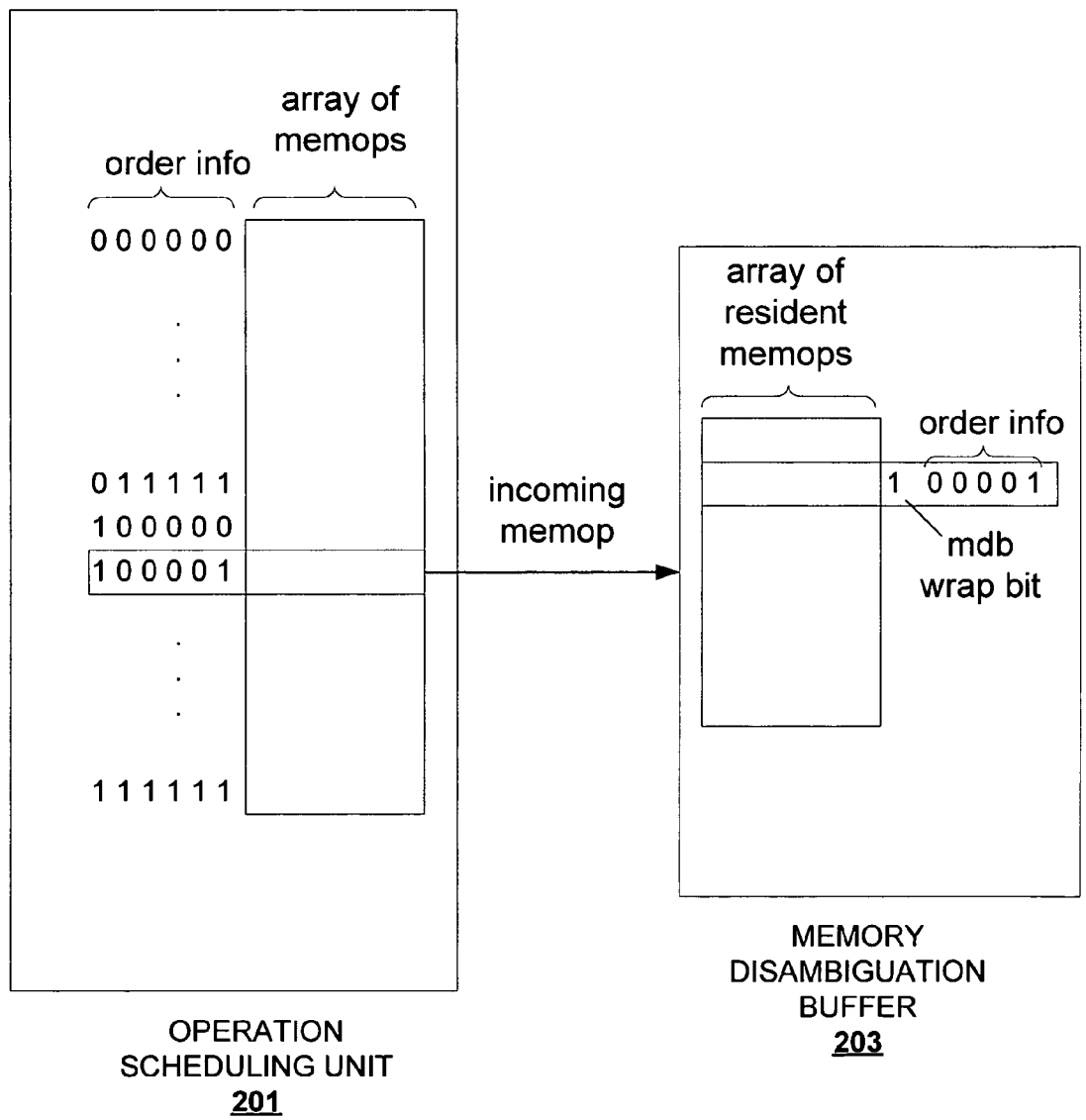
FIG. 2 depicts exemplary order information according to realizations of the invention.

FIG. 2 depicts exemplary order information according to realizations of the invention. An operation scheduling unit 201 includes an array of memory operations and their corresponding order information. The exemplary operation scheduling unit of FIG. 2 depicts a 64 entry operation scheduling unit 201 with 6-bits of order information. The most significant bit of the operation scheduling unit 201 order information is a wrap bit from the perspective of a memory disambiguation buffer 203. The memory disambiguation buffer 203 has 32 entries, hence 5-bits of order information.

The operation scheduling unit 201 issues a memory operation from entry 100001 of the operation scheduling unit 201 to the memory disambiguation buffer 203. The issued memory operation, or incoming memory operation from the perspective of the memory disambiguation buffer 203, becomes entry 00001 in the memory disambiguation buffer 203. The order, or age, of the incoming memory operation is determined from both the memory operation's order information in the memory disambiguation buffer and the wrap bit. Various realizations of the invention have different numbers of entries in the operation scheduling unit and the memory disambiguation buffer. In addition, the ratio of entries between the operation scheduling unit and the memory disambiguation unit varies in realizations of the invention. The different ratios may affect order information in the memory disambiguation buffer in various realizations of the invention (e.g., multiple wrap bits).

Returning to FIG. 1, various realizations of the invention indicate order information differently and process the order information differently (e.g., some order information flows into the order qualifier block 101 while the remaining flows into the memory operation order characteristic block 105, all of the incoming memory operation order information flows into the order qualifier block 101, etc.). FIG. 1 includes a dashed line, which may carry incoming memory operation order information, that bypasses the order qualifier block 101 and carries the incoming memory operation order information to the memory operation order characteristic order indication block 105. For example, the wrap bit from FIG. 2 flows into the order qualifier block 101 while the remaining 5-bits of order information flow into the memory operation order characteristic indication block 105. The order qualifier block 101 either leaves the wrap bit unchanged or complements the value, depending on the type of the incoming memory operation (e.g., the wrap bit remains unchanged if the incoming memory operation is a read type memory operation and is complemented if the incoming memory operation is a write type memory operation).

The memory operation type qualifier block 103 receives resident memory operation type information and the incoming memory operation type information. The memory operation indication block 103 indicates to the memory operation order characteristic indication block 105 qualified resident memory operation types. The memory operation type qualifier block 103 indicates those resident memory operations of a type of interest for the particular incoming memory operation. For example, if the incoming memory operation is a read type memory operation, then resident write type memory operations may be of interest. Alternatively, if the incoming memory operation is a write type memory operation, then resident read type memory operations may be of interest. Various realizations of the invention indicate type information differently (e.g., a vector having 1's set for resident memory operations of interest).

The memory operation order characteristic indication block 105 receives the incoming memory operation's address representation (e.g., virtual address, virtual address tag, part of the virtual address, a hash of a physical address, etc.), the incoming memory operation's order information, the incoming memory operation's qualified order information, the qualified resident memory operation types, the resident memory operation's order information, and address representations of the resident memory operations. The following table provides an example of information for a RAW hazard that flows into the memory operation order characteristic indication block 105 to aid in understanding the described invention, but not meant to limit the described invention.

TABLE 1

Information for RAW hazard

| Memop | Pre-qualified order information | Qualified order information | Pre-qualified Memop type information | Qualified memop type information |
| --- | --- | --- | --- | --- |
| write A | 000011 | 000011 | 1 | 1 |
| write A | 000101 | 000101 | 1 | 1 |
| Read B | 000111 | 000111 | 0 | 0 |
| write A | 001011 | 001011 | 1 | 1 |
| read A | 100101 | 100101 | 0 | 0 |

Assume that the first four operations in table 1 were issued in the order they appear from an operation scheduling unit and that the last operation is the incoming memory operation. Also assume that the logic illustrated in FIG. 1 is configured to handle RAW hazards as the default data hazard. The exemplary configured logic in this example marks read type memory operations with 0's and write type memory operations with 1's as each memory operation enters a memory disambiguation buffer. When the incoming memory operation is a read type memory operation, then the order information and the type information will not be changed by the qualifier blocks 101 and 103.

Table 2 provides an example of information for an overeager read (OER) hazard that flows into the memory operation order characteristic indication block 105. OER hazards includes overeager data hazards for read type operations, which can include OEL hazards.

TABLE 2

Information for OER hazard

| Memop | Pre-qualified order information | Qualified order information | Pre-qualified Memop type information | Qualified memop type information |
|---|---|---|---|---|
| read A | 001011 | 001011 | 0 | 1 |
| read A | 010101 | 010101 | 0 | 1 |
| write B | 001100 | 001100 | 1 | 0 |
| read A | 100101 | 100101 | 0 | 1 |
| write A | 000111 | 100111 | 1 | 0 |

As with table 1, assume that the first four operations in table 2 were issued in the order they appear from an operation scheduling unit and that the last operation is the incoming memory operation. Also assume the same logic as assumed for table 1. For the case of an incoming write type memory operation, the order information and the type information are qualified by the qualifier block 101 and 103. Assuming order information is implemented as depicted in FIG. 2 with a wrap bit (i.e., the most significant bit of the order information), the wrap bit is complemented for the incoming memory operation. In addition, the qualified memory operation type information for all of the memory operations, both resident and incoming, is reverse of the pre-qualified information. The information and exemplary descriptions for Tables 1 and 2 are meant to aid in understanding the described invention and not meant to limit the described invention. This specific description for qualifying information is for exemplary purposes alone. Various realizations of the invention qualify different information with any number of techniques (e.g., memory operations of interest may be filtered without masks, the described exemplary logic may be configured to treat OER hazards as the default data hazard, etc.).

The memory operation order characteristic indication block 105 includes logic that indicates a particular order characteristic based at least in part on the received order information. Qualification of order information for one data hazard allows the same logic to be recycled for at least two different data hazards. For example, assume that the memory operation order characteristic indication block 105 includes logic that indicates resident memory operations that are older than an incoming memory operation (i.e., the default data hazard is a RAW hazard). Referring to FIG. 2, older memory operations have lower order information and younger memory operations have higher order information. Using the order information of FIG. 2 as an example, then the following exemplary logic indicates those resident memory operations that are older than the incoming memory operation.

|  | Resident Memop |  | Incoming Memop |
|---|---|---|---|
| same wrap | order info | < | order info |
| !same wrap | order info | > | order info |

If a resident memory operation with a same wrap bit as an incoming memory operation has order information that is less than the order information of the incoming memory operation, then the resident memory operation will be indicated as older (e.g., a corresponding bit in an age mask will be set to 1).

For an OER scenario, the following exemplary logic indicates memory operations younger than an incoming memory operation.

|  | Resident Memop |  | Incoming Memop |
|---|---|---|---|
| same wrap | order info | > | order info |
| !same wrap | order info | < | order info |

The logic for indicating younger memory operations is the complement of the logic for indicating older memory operations. If the wrap bit of an incoming memory operation is complemented, then the logic that indicates older memory operations will indicate younger memory operations. Whether the memory operation order characteristic indication block 105 includes logic to indicate older resident memory operations or younger resident memory operations, qualifying the order information of an incoming memory operation allows both order characteristics to be indicated with the same logic. Various realizations of the invention may qualify order information differently (e.g., qualify all of the resident memory operations' order information). The memory operation order characteristic indication block 105 indicates the resident memory operations with the relevant order characteristic (i.e., older or younger) and passes the indications to a priority picker.

Figure 3:
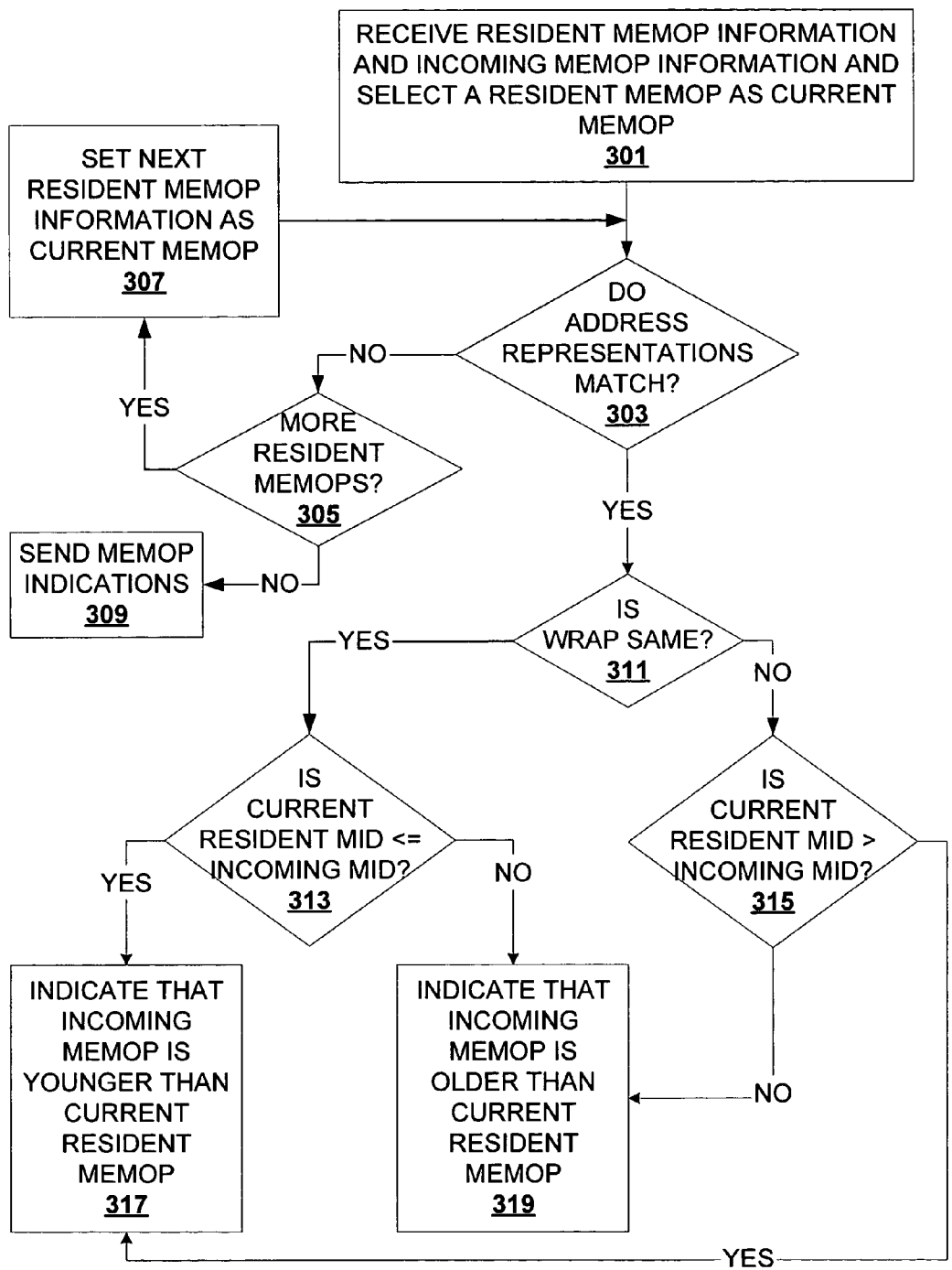
FIG. 3 depicts a flowchart for indicating an age characteristic according to realizations of the invention.

FIG. 3 depicts a flowchart for indicating an age characteristic according to realizations of the invention. At block 301, resident memory operation information and incoming memory operation information are received, and a resident memory operation is selected as a current memory operation. At block 303, it is determined if the address representations (e.g., virtual address, part of the virtual address, virtual address tag, hash of physical address, etc.) of the current resident memory operation and the incoming memory operation match. For example, the memory operation order characteristic indication block 105 may perform the comparison of address representations. Alternatively, the memory operation order characteristic indication block 105 receives a vector of information that indicates which resident memory operations have address representations that match the incoming memory operation's address representation. If the address representations do not match, then control flows to block 305. If the address representations match, then control flows to block 311.

At block 305, it is determined if there are more resident memory operations. If there are more resident memory operations, then control flows to block 307. If there are no more resident memory operations, then control flows to block 309.

At block 309, the order characteristic indications for the resident memory operations are sent.

At block 307, the next resident memory operation becomes the current resident memory operation. Control flows from block 307 back to block 303.

At block 311, it is determined if the wrap bit for the incoming memory operation and the current memory operation is the same. If the wrap bit is not the same, then control flows to block 315. If the wrap bit is the same, then control flows to block 313.

At block 315, it is determined if the current resident's order information is greater than the incoming memory operation. If the current resident memory operation's order information is greater than the incoming memory operation's order information, then control flows to block 317. If the current resident memory operation is less than the incoming memory operation, then control flows to block 319.

At block 317, the current resident memory operation is indicated as older than the incoming memory operation.

At block 319, the current resident memory operation is indicated as younger than the incoming memory operation.

At block 313, it is determined if the current resident memory operation's order information is less than the incoming memory operation's order information. If the current resident memory operation's order information is less than the incoming memory operation's order information, then control flows to block 317. If the current resident memory operation is greater than the incoming memory operation, then control flows to block 319.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). Also, it should be understood that in various realizations of the invention the decisions performed by the blocks in the flowchart depicted in FIG. 2 are implicit. The information flows through logic that operates on the information. For example, blocks 305, 307, and 309 may not be performed explicitly. The information is a vector of information that flows through logic without the logic stepping through each piece of information that corresponds to a different resident memory operation. In addition, block 303 may be performed by a different unit.

Table 3 below provides an example of vectors used to indicate particular resident memory operations to resolve an OER hazard.

TABLE 3

Vectors for OER hazard resolution

| Memop | Qualified order vector | Order char vector | Qualified type vector | Matching address rep vector | Candidate memops vector |
|---|---|---|---|---|---|
| read A | 001011 | 1 | 1 | 1 | 1 |
| read A | 010101 | 1 | 1 | 1 | 1 |
| write B | 001100 | 1 | 0 | 0 | 0 |
| read A | 100101 | 0 | 1 | 1 | 0 |
| write A | 100111 | — | — | — | — |

Order characteristic vector in table 3 indicates which resident memory operations are younger than the incoming memory operation. As previously described, the logic indicates resident memory operations that are older than an incoming memory operation, but when the order information is qualified for OER hazards (again assuming the logic is configured for RAW hazards instead of for OER) the logic indicates younger resident memory operations. If all of the vectors are combined, then the only remaining candidate resident memory operations are the first two read type memory operations. The resident write type memory operation does not have a matching address representation and is of the wrong type. The third resident read type memory operation is not younger than the incoming write type memory operation.

Figure 4A:
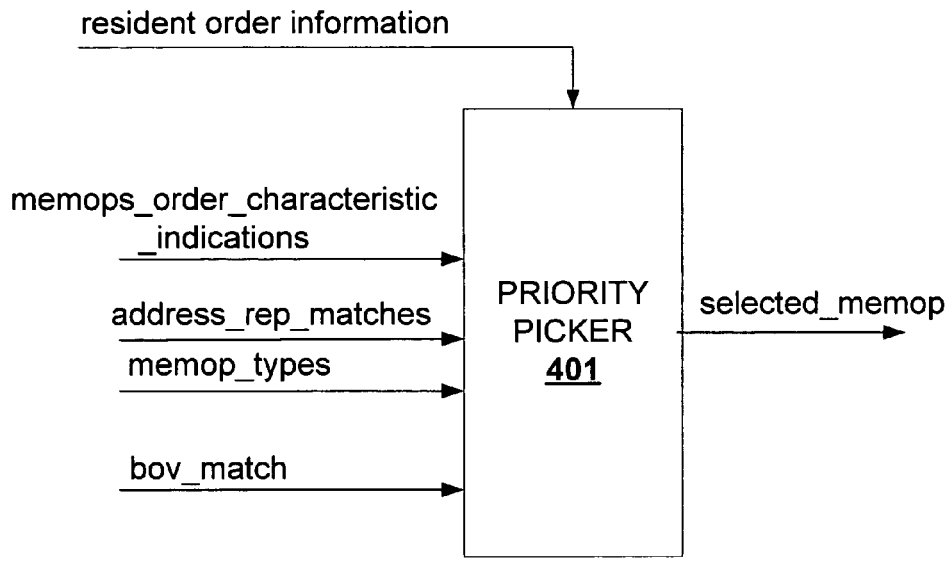
FIGS. 4A-4B depict exemplary priority pickers according to realizations of the invention.
Figure 4B:
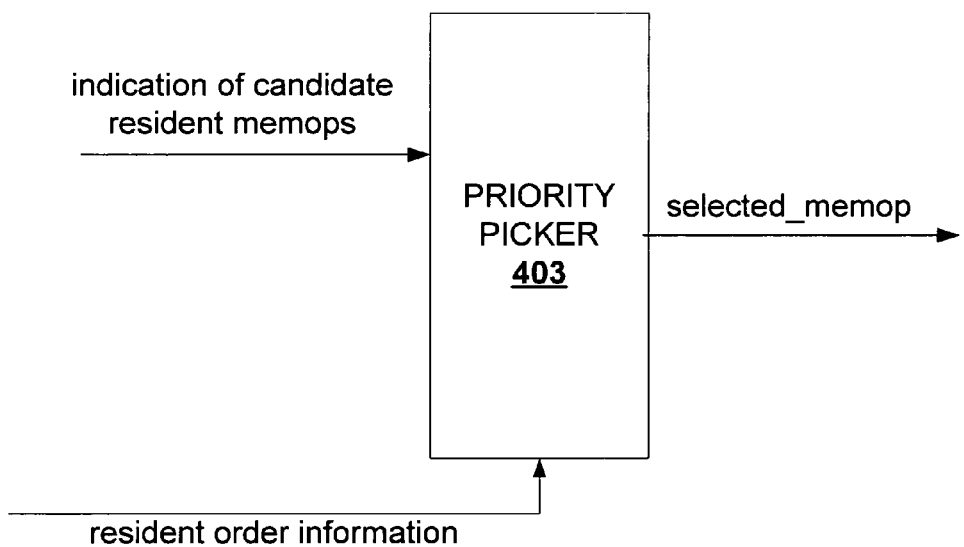

FIGS. 4A-4B depict exemplary priority pickers according to realizations of the invention. FIG. 4A depicts an exemplary priority picker that selects a resident memory operation with a particular order characteristic according to realizations of the invention. A priority picker 401 receives 4 vectors of information in FIG. 4A. The priority picker 401 receives a memops_order_characteristic_indications vector, which indicates those resident memory operations with the order characteristic relevant to the data hazard being handled. For example, the memops_order_characteristic_indications vector indicates each resident memory operation that is older than an incoming memory operation for a RAW data hazard, or indicates each resident memory operation that is younger than an incoming memory operation for an OER data hazard. The priority picker 401 also receives an address_rep_matches vector, a memop_types vector, and a bov_match vector. The address_rep_matches vector indicates those resident memory operations with address representations that match the incoming memory operation's address representation. The memop_type vector indicates those resident memory operations of the relevant memory operation type (e.g., read type memory operations for a RAW hazard, write type memory operations for an OER hazard, etc.). The bov_match vector indicates those resident memory operations with data that overlaps the data corresponding to the incoming memory operation. The priority picker 401 also receives resident memory operations' order information. The priority picker 401 determines which memory operations to consider based on all of the received vectors.

The combination of the vectors indicates which of the resident memory operations have matching address representations, data overlap, and are of the relevant memory operation type with the incoming memory operation (i.e., which resident memory operations are candidates for selection). The order information of the candidate resident memory operations flow through the priority picker 401. The priority picker 401 indicates which one of the candidate resident memory operations satisfies a given order criteria, and sends indication of the selected resident memory operation. The selected resident memory operation is used for resolving a data hazard. For example, the priority picker 401 indicates the youngest of the candidate resident memory operations. The youngest indicated resident memory operation may be indicated for OER coloring, RAW bypass, etc. RAW bypass may be performed with a predictive technique that compares address representations instead of complete addresses to efficiently identify a write type memory operation candidate for RAW bypass. Such a technique is described in more detail in commonly owned, co-pending U.S. patent application Ser. No. 10/747,584, filed Dec. 29, 2003, naming as inventors Krishna Thatipelli and Balakrishna Venkatrao, entitled "Efficient Read After Write Bypass," which is incorporated herein by reference in its entirety.

FIG. 4B depicts another exemplary priority picker that selects a resident memory operation for data hazard resolution operations according to realizations of the invention. A priority picker 403 is similar to the priority picker 401 of FIG. 4A. However, unlike the priority picker 401, the priority picker 403 receives a vector that already indicates candidate resident memory operations. For example, the memory operation order characteristic indication block 105 of FIG. 1 determines those resident memory operations with address representations that match the incoming memory operation, and that are of the relevant memory operation type. It is assumed that other units have determined data overlap and AND'd the vectors together to generate the indications of candidate resident memory operations. The priority picker 403 selects one of the candidate resident memory operations and indicates the selected resident memory operation to one or more other units for data hazard resolution.

Utilizing a single priority picker in addition to recycling logic for different data hazards significantly reduces processor area consumed for data hazard resolution. A design that recycles the logic as previously described and utilizes a single priority picker maintains processor performance with data hazard resolution while releasing space on the processor for other logic and/or memory.

Figure 5:
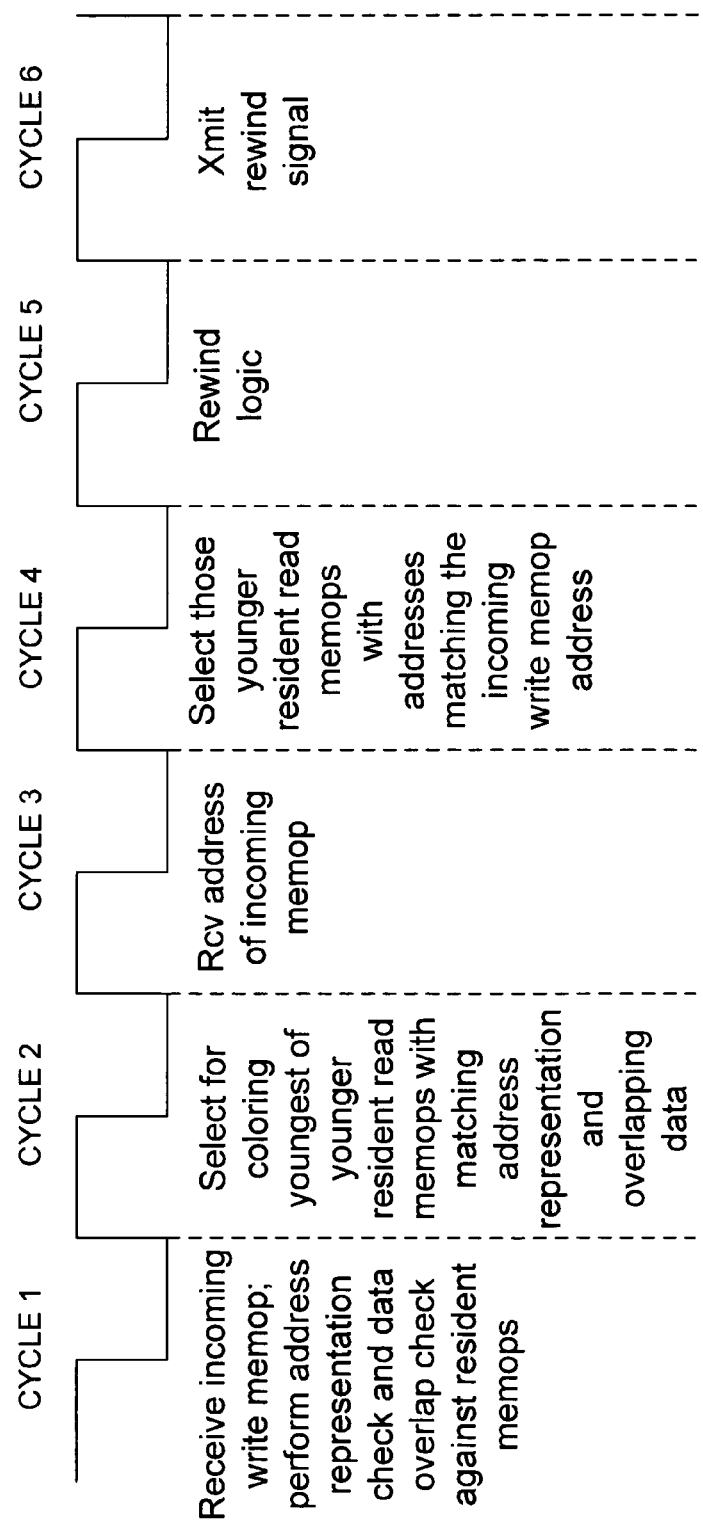
FIG. 5 depicts OER data hazard resolution operations according to realizations of the invention.
Figure 6:
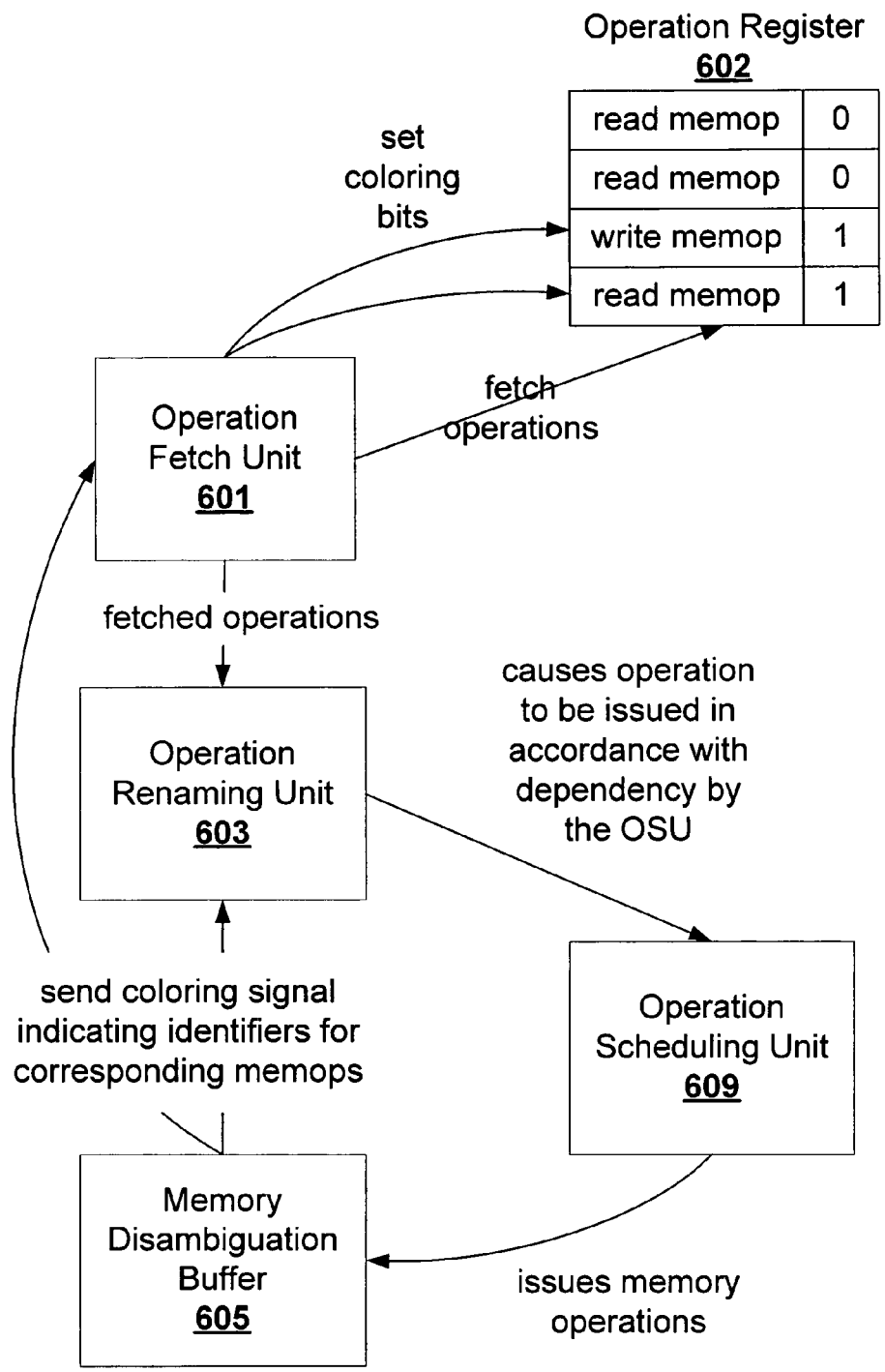
FIG. 6 depicts coloring of memory operations for OER data hazard resolution according to realizations of the invention.

FIG. 5 depicts OER data hazard resolution operations according to realizations of the invention. In a first cycle, an incoming write type memory operation is received. Comparison of address representations is performed between the incoming write type memory operation and resident memory operations. Also, byte overlap check is performed between the incoming write type memory operation and the resident memory operations. In a second cycle, a youngest of resident read type memory operations, which are younger than the incoming write type memory operation, with an address representation that matches the incoming write type memory operation's address representation and with data that overlaps the incoming write type memory operation is selected for coloring. For example, the priority picker 401 or 403 selects a youngest read type memory operation from a group of resident read type memory operations that are younger than the incoming write type memory operation. In a third cycle, the address of the incoming write type memory operation is received. In a fourth cycle, those younger resident read type memory operations with addresses matching the received write type memory operation's address are selected. In a fifth cycle, rewind logic operates based at least in part on the read type memory operations selected in the fourth cycle. In a sixth cycle, a rewind signal is transmitted. The number of cycles depicted in FIG. 6 are meant to aid in understanding the described invention and not mean to be limiting upon the described invention. It should be understood that the number of cycles to perform operations may vary between different platforms, as platforms evolve, as instruction sets change, etc.

FIG. 6 depicts coloring of memory operations for OER data hazard resolution according to realizations of the invention. A memory disambiguation buffer (MDB) 605 sends a coloring signal indicating identifiers for corresponding memory operations. For example, the MDB 605 indicates the incoming write type memory operation and the selected resident read type memory operation as in cycle 2 of FIG. 5. The MDB 605 sends the coloring signal to an operation fetch unit 601 and an operation renaming unit 603. The operation fetch unit 601 locates the indicated memory operations in an operation register 602 (e.g., mapping into the corresponding entries in the operation register 602 with the operation identifiers) and sets their coloring bits. The operation fetch unit 601 fetches operations from the operation register 602 and passes them to the operation renaming unit 603. The operation renaming unit 603 imposes a data dependency on the indicated operations and causes an operation scheduling unit 609 to issue operations in accordance with the coloring (e.g., indicating to the operation scheduling unit when a write type memory operation has completed). The operation scheduling unit 609 issues memory operations in accordance with the imposed data dependencies to the MDB 605.

In addition to reducing valuable processor area, utilizing a single priority picker improves processor performance. Implementing coloring without the described techniques for utilizing a single priority picker would call for extra pipe-line stages on the store path. Hence, stores would effectively have taken longer time to complete from issue to retire with a coloring scheme based on multiple priority pickers. However, with logic that allows a single priority picker to be utilized the benefits of coloring can be reaped without the cost of additional pipeline stages.

Figure 7:
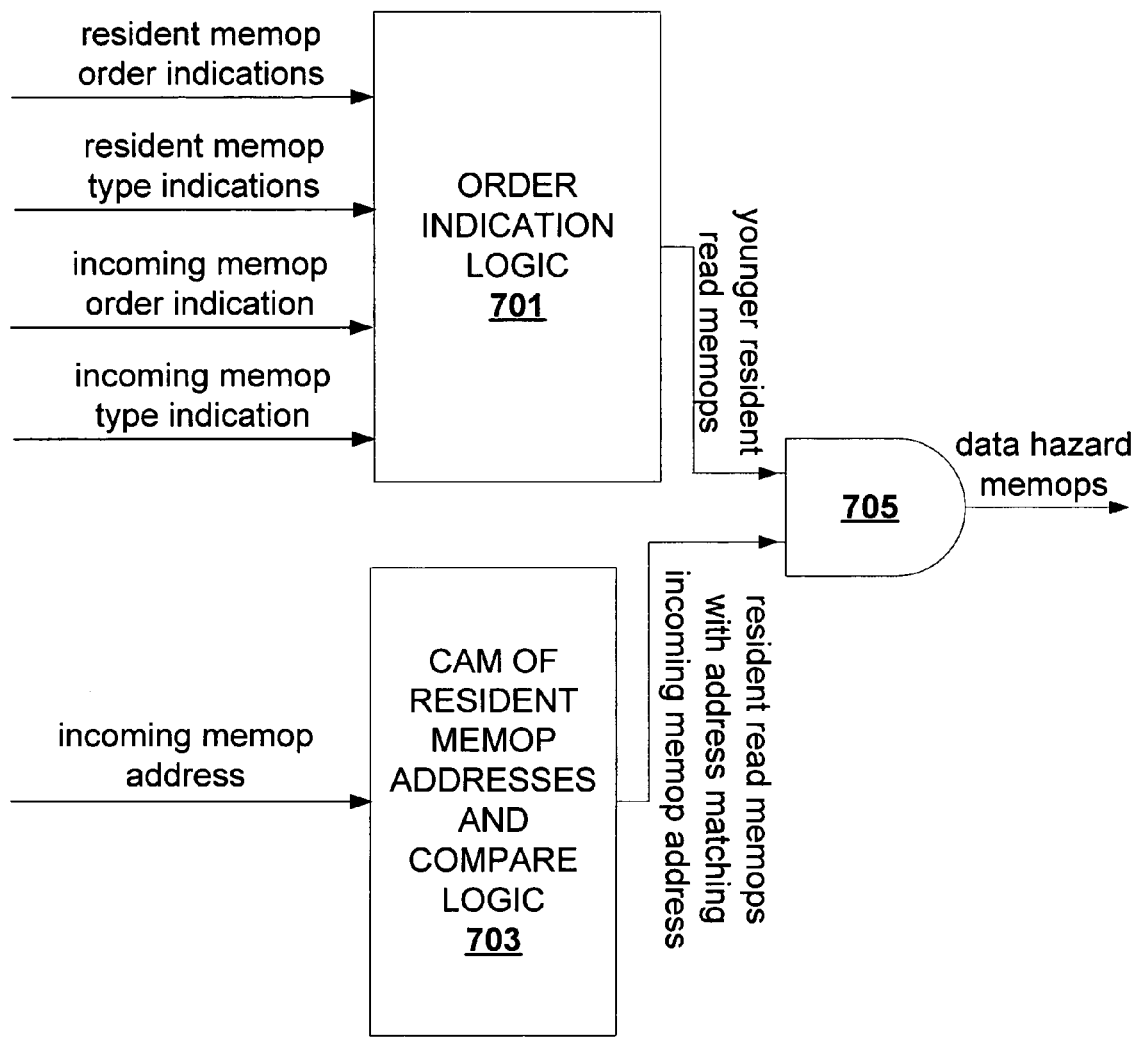
FIG. 7 depicts selection of read type memory operations for OER rewind according to realizations of the invention.

FIG. 7 depicts selection of read type memory operations for OER rewind according to realizations of the invention. In FIG. 7, an order indication logic 701, similar to the order characteristic indication block 105 of FIG. 5, receives order indications and memory operation type indications for both resident memory operations and an incoming memory operation. The order indication logic 701 indicates younger resident read memory operations based at least in part on the received indications. A block 703 is a content addressable memory (CAM) of resident memory operation addresses and compare logic. The block 703 compares the incoming memory operation's address against all of the resident memory operations' addresses. A CAM is depicted for illustrative purposes alone. Various realizations of the invention implement different mechanisms for storing resident memory operations' addresses and comparing them against an incoming memory operation's address. The block 703 indicates those resident memory operations with addresses that match the incoming memory operation's address. The indication from the block 703 and the indication from the order indication logic 701 flow into an AND gate 705. From the AND gate flows indications of those resident read type memory operations with data dependencies on the incoming write type memory operation (i.e., OER hazards).

Figure 8:
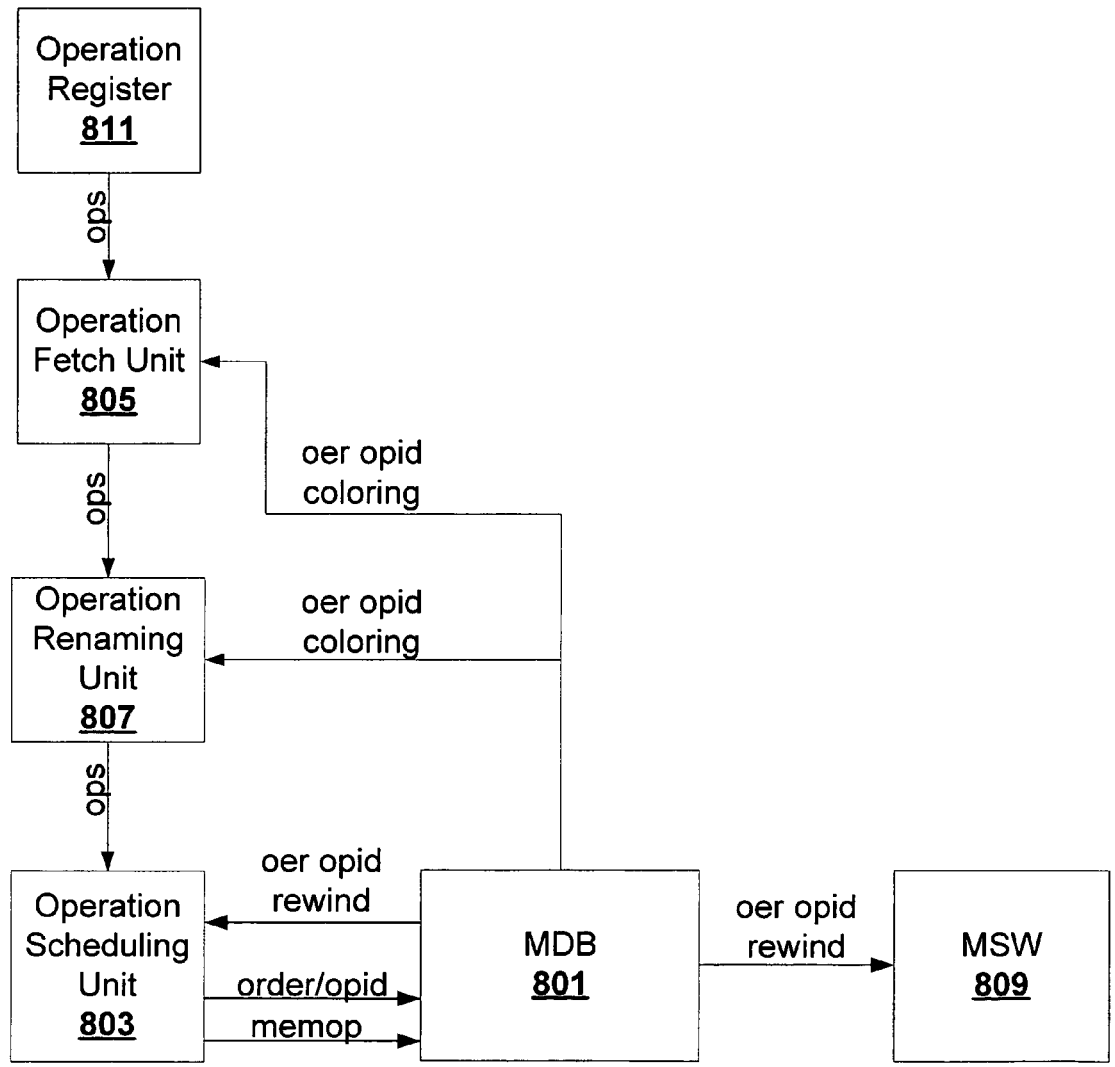
FIG. 8 depicts an exemplary memory disambiguation buffer communicating rewind to other units according to realizations of the invention.

FIG. 8 depicts an exemplary memory disambiguation buffer communicating rewind to other units according to realizations of the invention. An operation fetch unit 805 fetches operations from an operation register 811 and passes them to an operation scheduling unit 803. The operation scheduling unit 803 passes memory operations, their order information, and their identifiers to an MDB 801. The MDB 801 detects a possible overeager read data hazard and sends an overeager read coloring signal to the operation fetch unit 805 and an operation renaming unit 807, similar to FIG. 6. After determining the incoming write type memory operation's address (e.g., from a data translation lookahead buffer), the MDB 801 determines overeager read hazards and generates a rewind signal. The MDB 801 sends the rewind signal along with indications of the relevant read type memory operations to a memory scheduling window 809. The memory scheduling window 809 flushes the indicated read type memory operations from its buffers, and may also drop requests from any of the read type memory operations being flushed. The operation scheduling unit 803 reissues the indicated read type memory operations in accordance with coloring bits. If there are multiple read type memory operations that have data dependency with the incoming write type memory operation, then after a few iterations these read type memory operations will also have their coloring bits set.

Figure 9:
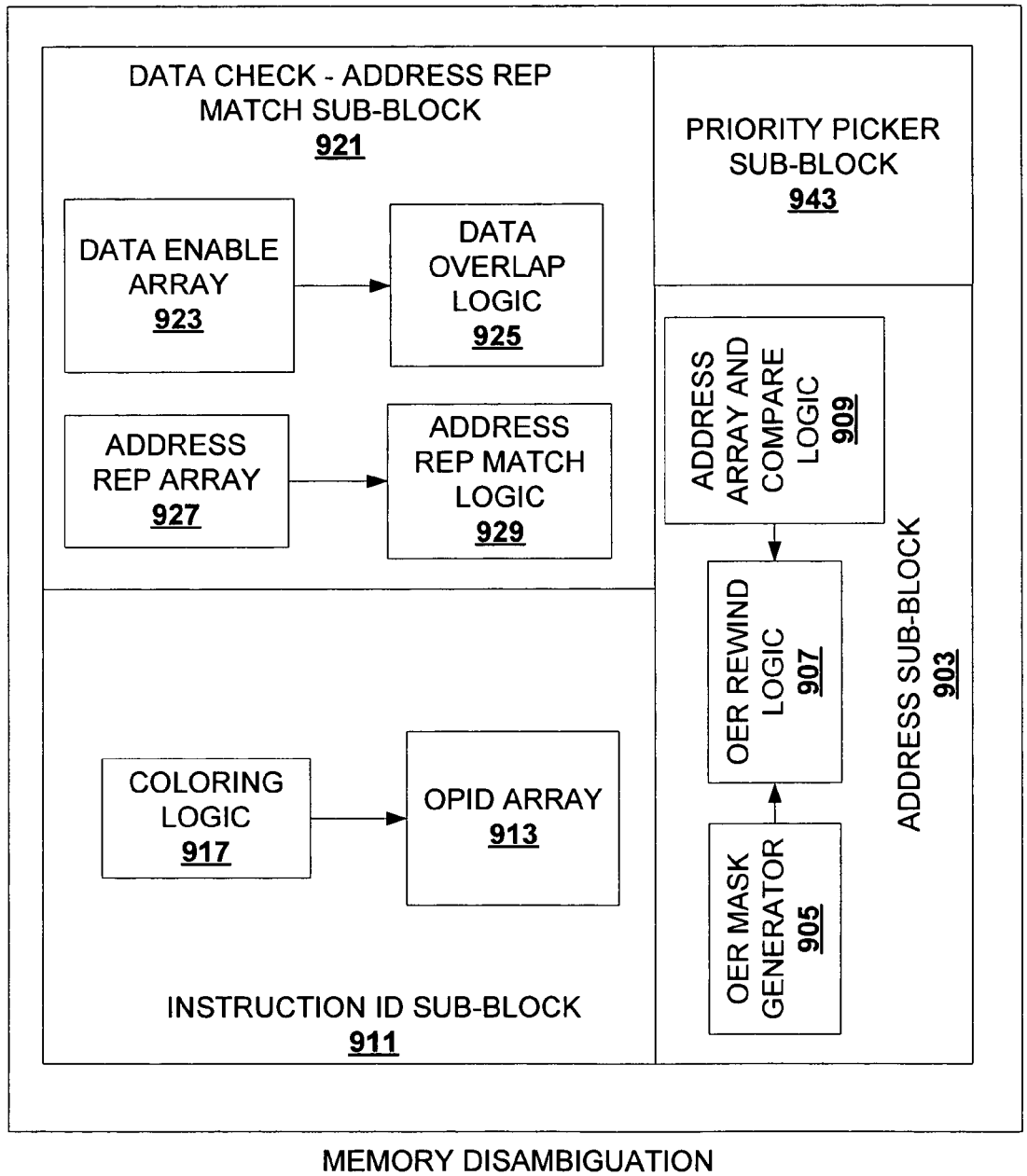
FIG. 9 depicts exemplary sub-blocks of a memory disambiguation buffer according to realizations of the invention.

FIG. 9 depicts exemplary sub-blocks of a memory disambiguation buffer according to realizations of the invention. A memory disambiguation buffer 931 includes a data check-address representation match sub-block 921, an instruction identifier sub-block 911, an address sub-block 903, and a priority picker sub-block 943. The data check-address representation match sub-block 921 includes a data enable array 923, a data overlap logic 925, an address representation array 927, and an address representation logic 929. The data enable array 923 includes entries for each resident memory operation. Each of the entries indicates the amount of data enabled for the corresponding resident memory operation. The data overlap logic 925 determines data overlap based on these entries. The address representation array 927 (e.g., a summing content addressable memory) hosts address representations of the target memory locations for each of the resident memory operations. The address representation match logic 929 determines which of the resident memory operations' address representations match the incoming memory operation's address representation.

The address sub-block 903 includes an overeager read (OER) mask generator 905, OER rewind logic 907, and an address array and compare logic 909. The OER mask generator 905 indicates those resident read type memory operations that are younger than the incoming write type memory operation. The address array and compare logic 909 (e.g., a content addressable memory) hosts the addresses of resident memory operations and compares them against the incoming memory operation's address. The OER rewind logic 907 generates a rewind signal depending on the information from the address array and compare logic 909 and the OER mask generator 905.

The instruction identifier sub-block includes coloring logic 917 and an operation identifier array 913. The coloring logic 917 receives one or more inputs from the data check-address representation match sub-block 921 and the priority picker sub-block 943 that indicate which of the resident read type memory operations have been selected for coloring. The coloring logic 917 looks up in the operation identifier array 913 the operation identifier that corresponds to the selected memory operation.

The sub-blocks depicted in FIG. 9 are exemplary. In addition, the memory disambiguation buffer may include additional sub-blocks, and the depicted sub-blocks may include additional or fewer logic, both of which are not illustrated to avoid obfuscating the described invention.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 10:
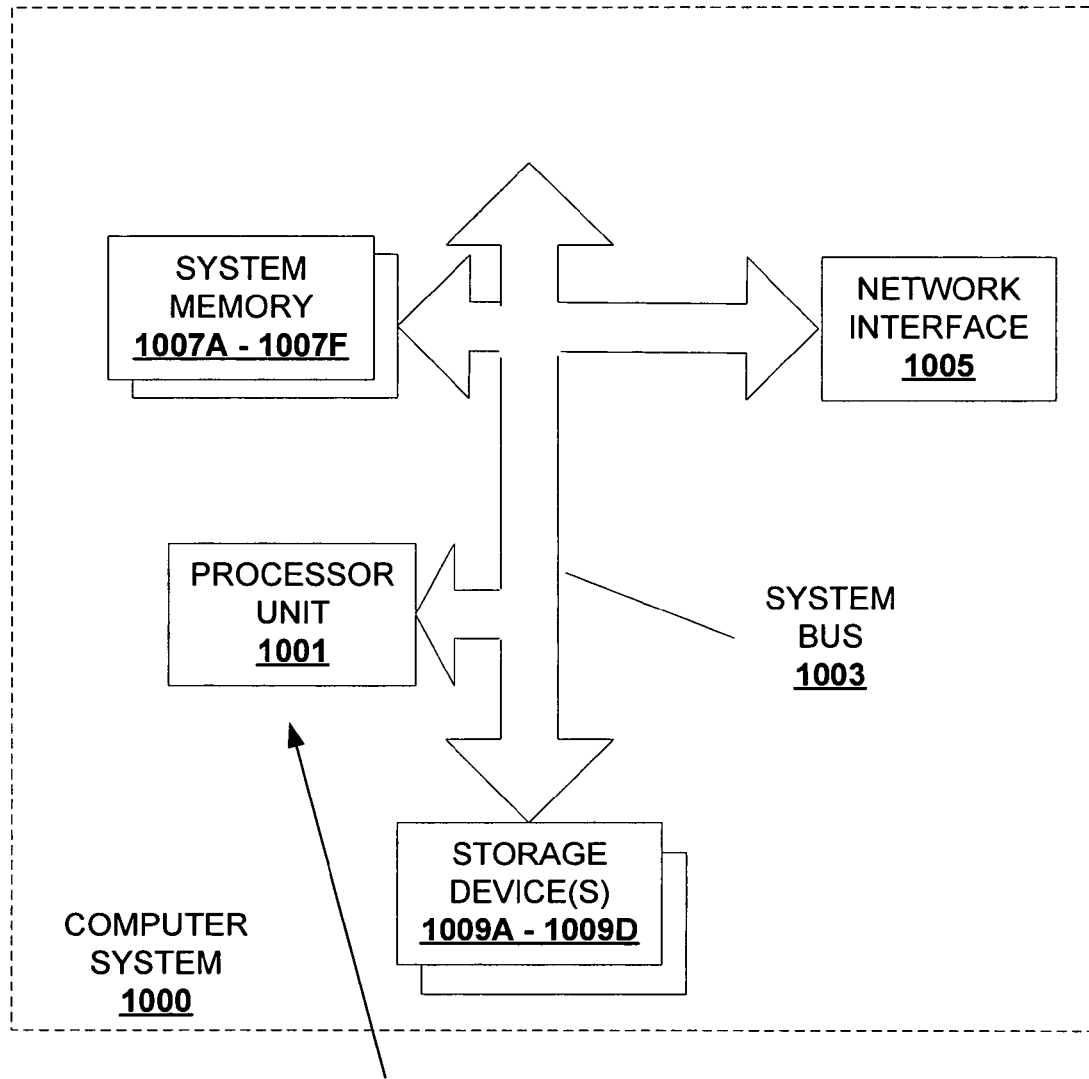
FIG. 10 depicts an exemplary computer system according to realizations of the invention.

FIG. 10 depicts an exemplary computer system according to realizations of the invention. A computer system 1000 includes a processor unit 1001 (possibly including multiple processors). The processor unit 1001 includes recyclable logic for at least two different type of data hazards and a single priority picker for data hazard resolution. For example, the processor unit 1001 includes the memory disambiguation buffer depicted in FIG. 9, the data hazard resolution unit depicted in FIG. 1, etc. The computer system 1000 also includes a system memory 1007A-1007F (e.g., one or more of cache, SRAM DRAM, RDRAM, EDO RAM, DDR RAM, EEPROM, etc.), a system bus 1003 (e.g., LDT, PCI, ISA, etc.), a network interface 1005 (e.g., an ATM interface, an Ethernet interface, a Frame Relay interface, etc.), and a storage device(s) 1009A-1009D (e.g., optical storage, magnetic storage, etc.). Realizations of the invention may include fewer or additional components not illustrated in FIG. 10 (e.g., video cards, audio cards, additional network interfaces, peripheral devices, etc.). The processor unit 1001, the storage device(s) 1009A-1009D, the network interface 1005, and the system memory 1007A-1007F are coupled to the system bus 1003. Although FIG. 10 illustrates the processor unit 1001 as including the branch prediction structure, various realizations of the invention implement the branch prediction structure differently (e.g., storage separate from the processor, storage in a co-processor, etc.).

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. For example, an operation fetch unit may be referred to as an instruction fetch unit, an instruction buffer may perform some or all of the functionality of the operation fetch unit, the operation scheduling unit, and/or the renaming unit, the memory disambiguation buffer may be referred to as a data hazard resolution unit, the memory disambiguation buffer may include a data hazard resolution unit, etc.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A data hazard resolution unit that resolves at least two different data hazards between resident memory operations and incoming memory operations with a set of logic that indicates order of the resident memory operations relative to the incoming memory operations, wherein the indicated order corresponds to the data hazard being resolved, and that includes a priority picker to select one of the indicated resident memory operations for either data hazard, wherein the set of logic modifies order information of those incoming memory operations that correspond to a first of the data hazards, but does not modify order information of those incoming memory operations that correspond to a second of the data hazards.

2. The data hazard resolution unit of claim 1 wherein the set of logic performs one of at least two comparison operations based at least in part on the order information.

3. The data hazard resolution unit of claim 2 wherein the set of logic indicates the order as those resident memory operations that are younger than the incoming memory operations if the order information is not modified and indicates the order as those resident memory operations that are older than one of the incoming memory operations if the order information is modified.

4. The data hazard resolution unit of claim 3 wherein the set of logic makes a greater than comparison between the resident memory operations and those incoming memory operations with order information that indicates a first value and makes a less than comparison between the resident memory operations and those incoming memory operations with order information that indicates a second value.

5. The data hazard resolution unit of claim 4 wherein the order information includes one or more wrapping bits.

6. The data hazard resolution unit of claim 1 wherein the data hazards include read-after-write and overeager-read.

7. The data hazard resolution unit of claim 1 wherein the priority picker picks a youngest of the indicated resident memory operations.

8. The data hazard resolution unit of claim 7 that bypasses data from the youngest of the indicated resident memory operations to one of the incoming memory operations, wherein the resident memory operations are write type memory operations that are older than the one of the incoming memory operation, which is a read type memory operation.

9. The data hazard resolution unit of claim 7 that causes a dependency to be imposed between the youngest of the indicated resident memory operations and one of the incoming memory operations, wherein the indicated resident memory operations are read type memory operations that are younger than the one of the incoming memory operations, which is a read type memory operation.

10. The data hazard resolution unit of claim 9 wherein said causes the dependency to be imposed includes causing information that corresponds to the youngest of the indicated resident memory operations and a corresponding one of the incoming memory operations to indicate the dependency.

11. The data hazard resolution unit of claim 9 wherein causes imposition of the data dependency comprises generating a coloring signal and indicating the youngest read type memory operation and the corresponding write type memory operation.

12. The data hazard resolution unit of claim 1 that compares addresses of each of the incoming memory operations against addresses of the resident memory operations and causes those indicated resident memory operations that correspond to an overeager-read data hazard to be reissued.

13. The data hazard resolution unit of claim 12 wherein causes reissue comprises generating a rewind signal, which causes flushing of the indicated resident memory operations for reissue.

14. The data hazard resolution unit of claim 1, wherein the data hazard resolution unit includes a memory disambiguation buffer or a load store queue.

15. A method comprising:
    determining if an incoming memory operation is of a first or second type of memory operation;
    modifying order information of the incoming memory operation if the incoming memory operation is of a first type of memory operation, but not if the incoming memory operation is of a first type of memory operation;
    comparing the incoming memory operation and the resident memory operations based at least in part on the order information of the incoming memory operation;
    indicating those of the resident memory operations with a first order characteristic based at least on the comparing; and
    selecting one of the indicated resident memory operations with a second order characteristic relative to the other indicated resident memory operations.

16. The method of claim 15 wherein the first type of memory operation includes write type memory operations and the second type of memory operations include read type memory operations.

17. The method of claim 15 wherein the order information is an index value that indicates order of memory operations in a data hazard resolution unit.

18. The method of claim 15 wherein the first order characteristic includes the indicated resident memory operations being younger than the incoming memory operation.

19. The method of claim 18 wherein the indicated resident memory operations include candidate resident memory operations for overeager-read rewind.

20. The method of claim 15 wherein the first order characteristic includes the indicated resident memory operations being older than the incoming memory operation.

21. The method of claim 20 wherein data of the selected one of the indicated resident memory operations with the second order characteristic is bypassed to the incoming memory operation.

22. The method of claim 15 wherein the second order characteristic includes the selected indicated resident memory operation being younger than the other indicated resident memory operations.

23. The method of claim 15 embodied as a computer-readable storage medium encoded with instructions that, when executed by a computer, cause the computer to perform the method.

24. A method comprising:
    performing data hazard resolution operations for at least two different data hazards with a set of logic that modifies order information of incoming memory operations of a first type of memory operation, but does not modify order information of incoming memory operations of a second type of memory operation, and determines resident memory operations with a first order characteristic relative to the incoming memory operations based at least in part on the order information.

25. The method of claim 24 wherein data hazard resolution operations comprise determining which of the resident memory operations have address representations that match an incoming memory operation's address representation.

26. The method of claim 24 further comprising indicating one of the resident memory operation with the first order characteristic to have a second order characteristic with respect to the other resident memory operation with the first order characteristic.

27. The method of claim 26 wherein the second order characteristic includes the indicated one of the resident memory operations being the youngest of the resident memory operations with the first order characteristic.

28. The method of claim 27 wherein the youngest of the resident memory operations and an incoming memory operation are marked to indicate their data dependency.

29. The method of claim 27 wherein data of the youngest of the resident memory operations is bypassed to an incoming memory operation.

30. The method of claim 27 wherein the first order characteristic includes the resident memory operations being older or younger than the incoming memory operation.

31. The method of claim 24 wherein the order information includes one or more wrapping bits and wherein said modifies the order information includes complementing the wrapping bits.

32. The method of claim 24 wherein the first type of memory operation includes write type memory operations and a second type of memory operation includes read type memory operations.

33. The method of claim 24 wherein the at least two different data hazards include read after write hazards and write after read hazards.

34. The method of claim 24 wherein the data hazard resolution operations include read after write bypass and overeager read coloring.

35. The method of claim 24 embodied as a computer-readable storage medium encoded with instructions that, when executed by a computer, cause the computer to perform the method.

36. An apparatus comprising:
an order information modifying logic to modify order information of an incoming memory operation if the memory operation is a first of at least two different types of memory operations, but not if the memory operation is a second of the at least two different types of memory operations;
a memory operation type indication logic to indicate memory operation types;
a memory operations comparison logic coupled with the memory operation type indication logic and the order information modifying logic, the memory operations comparison logic to compare the incoming memory operation against resident memory operations based at least in part on the incoming memory operation's order information and the resident memory operations' order information, and to indicate a first order characteristic of the resident memory operations relative to the incoming memory operation.

37. The apparatus of claim 36 further comprising a fourth logic to indicate one of the resident memory operations as having a second order characteristic relative to the other resident memory operations.

38. The apparatus of claim 37 further comprising a fifth logic to perform read after write bypass with a resident memory operation indicated by the fourth logic.

39. The apparatus of claim 37 further comprising a fifth logic to cause data dependency to be imposed on an incoming memory operation and a resident memory operation indicated by the fourth logic.

40. The apparatus of claim 39 wherein the data dependency is imposed with a coloring mechanism.

41. The apparatus of claim 37 wherein the second order characteristic includes the indicated one as being the youngest.

42. The apparatus of claim 41 wherein the first order characteristic includes the resident memory operations being younger than the incoming memory operation.

43. The apparatus of claim 36 wherein the two different data hazards include a read after write hazard and a write after read hazard.

44. The apparatus of claim 36 further comprising:
a fourth logic to compare addresses of the incoming memory operation and the resident memory operations and to indicate those resident memory operations with addresses matching the incoming memory operation's address; and
a fifth logic to cause rewind of those resident memory operations indicated by both the third and fourth logic.

45. A data hazard resolution unit comprising:
an resident memory operation address array block to host addresses of resident memory operations;
a memory operations compare block to compare address representations of resident and incoming memory operations, to determine data overlap between resident and incoming memory operations, to modify order information of incoming memory operations of a first type, but not of a second type, and to indicate two different order characteristics of resident memory operations relative to an incoming memory operation for at least two different data hazards based at least in part on the order information; and
a priority picker block to compare memory operations and indicate one resident memory operation with a second order characteristic relative to other resident memory operations.

46. The data hazard resolution unit of claim 45 further comprising an operation identifier block to host identifiers of resident memory operations.

47. The data hazard resolution unit of claim 46 further comprising the operation identifier block to determine operation identifiers of resident memory operations indicated by priority picker, the incoming memory operation, and resident memory operations indicated by the memory operations compare block.

48. The data hazard resolution unit of claim 47 to provide the operation identifiers of resident memory operations indicated by the memory operations compare block and the incoming memory operation for overeager read rewind.

49. The memory disambiguation buffer of claim 47 to provide the operation identifier of a resident memory operation indicated by the priority picker and the operation identifier of the incoming memory operation for overeager read coloring.

50. The data hazard resolution unit of claim 45 further comprising the address array block to compare hosted addresses against the incoming memory operation's address and to cause overeager read rewind for those resident memory operations with addresses matching the incoming memory operation's address and indicated by the memory operations compare block.

51. The data hazard resolution unit of claim 45 wherein the memory operations compare block includes a summing content addressable memory to compare address representations.

52. The data hazard resolution unit of claim 45 wherein the address array block includes a content addressable memory.

53. The data hazard resolution unit of claim 45 wherein the memory operations compare block to modify order information includes the memory operations compare block to complement at least part of the order information.

54. The data hazard resolution unit of claim 45 wherein the two different order characteristics include younger and older.

55. The data hazard resolution unit of claim 45 wherein the at least two different data hazards include an overeager read hazard and a read after write hazard.

56. A processor comprising:
a memory operation register to host memory operations and to set coloring information that indicates data dependency between memory operations; and
a data hazard resolution unit coupled with the memory operation register to modify order information of incoming memory operations that correspond to a first of at least two different data hazards, but not that correspond to a second of at least two different data hazards, and to indicate memory operations based at least in part on the order information to the memory operation register for setting of coloring information.

57. The processor of claim 56 further comprising a data cache unit and the data hazard resolution unit to indicate memory operations to the data cache unit for read after write bypass.

58. The processor of claim 56 further comprising:
a memory operation renaming unit to impose data dependencies based at least in part on the coloring information of memory operations; and
the data hazard resolution unit coupled with the memory operation renaming unit to indicate to the memory operation unit memory operations for coloring.

59. The processor of claim 56 wherein the at least two different data hazards include a read after write hazard and an overeager read hazard.

60. The processor of claim 56 further comprising:
 an operation scheduling unit to issue operations in accordance with imposed data dependencies; and
 the memory operation renaming unit to impose data dependencies on the operation scheduling unit.

61. The processor of claim 60 wherein the order information indicates indexing information that corresponds to order of operations in the operation scheduling unit.

62. The processor of claim 56, wherein the data hazard resolution unit includes a load store queue or a memory disambiguation buffer.

63. The processor of claim 56, wherein the processor includes multiple cores.

64. An apparatus comprising:
 a queue for memory operations; and
 means for modifying order information of memory operations that correspond to a first of at least two different data hazards, but not that correspond to a first of at least two different data hazards, and for indicating resident memory operations with a first order characteristic relative to an incoming memory operation based at least in part on the order information to resolve the corresponding data hazard.

65. The apparatus of claim 64 further comprising means for generating a rewind signal to rewind read type memory operations corresponding to a detected overeager read hazard.

66. The apparatus of claim 64 means for bypassing data from a resident write type memory operation to an incoming read type memory operation.

67. The apparatus of claim 64 means for indicating a priority resident memory operation with a second order characteristic relative to other resident memory operations for overeager read coloring or for read after write bypass.

\* \* \* \* \*